United States Patent [19]
Winski

[11] Patent Number: 5,299,691
[45] Date of Patent: Apr. 5, 1994

[54] SPACING SHEET FOR HANDLING MATERIAL

[75] Inventor: Ernest P. Winski, Oshkosh, Wis.

[73] Assignee: Kinetic Robotics, Inc., Menasha, Wis.

[21] Appl. No.: 672,314

[22] Filed: Mar. 20, 1991

Related U.S. Application Data

[63] Continuation-in-part of Ser. No. 449,235, Dec. 6, 1989, which is a continuation of Ser. No. 102,386, Sep. 29, 1987, abandoned, which is a continuation-in-part of Ser. No. 888,511, Jul. 23, 1986, abandoned.

[51] Int. Cl.$^5$ .............................................. B65D 19/38
[52] U.S. Cl. ................................ 206/527; 108/51.1; 108/52.1; 108/53.1; 108/55.3; 206/821
[58] Field of Search .............. 108/51.3, 52.1, 53.1, 108/901, 51.1, 55.3; 206/527, 821

[56] References Cited

U.S. PATENT DOCUMENTS

| | | | |
|---|---|---|---|
| 2,243,919 | 6/1941 | Paxton et al. | 144/3 |
| 2,455,197 | 11/1948 | Sullivan | 108/51.1 X |
| 2,656,047 | 10/1953 | Samler . | |
| 2,875,907 | 3/1959 | Locke et al. . | |
| 2,875,908 | 3/1959 | Woodcock . | |
| 2,878,948 | 3/1959 | Keyes . | |
| 2,937,482 | 5/1960 | Lazott et al. | 53/59 |
| 2,940,617 | 6/1960 | Reed . | |
| 2,978,125 | 4/1961 | Freeman . | |
| 3,105,598 | 10/1963 | Magnnson . | |
| 3,149,732 | 9/1964 | Gagmon et al. . | |
| 3,157,301 | 11/1964 | McWilliams . | |
| 3,159,115 | 12/1964 | Nolan | 108/51.1 |
| 3,166,203 | 1/1965 | Jeremiah . | |
| 3,229,836 | 1/1966 | Koenig . | |
| 3,257,006 | 6/1966 | Kampert . | |
| 3,278,048 | 10/1966 | Bruce . | |
| 3,430,585 | 3/1969 | Grant et al. | 108/51.1 |
| 3,534,872 | 10/1970 | Roth et al. . | |
| 3,540,385 | 11/1970 | Hobart | 108/51.1 |
| 3,594,977 | 7/1971 | Grasvoll | 53/162 |
| 3,637,093 | 1/1972 | Brockmuller et al. . | |
| 3,648,857 | 3/1972 | Grasvoll . | |
| 3,669,282 | 6/1972 | Carlson . | |
| 3,682,338 | 8/1972 | Von Gal, Jr. et al. . | |
| 3,720,176 | 3/1973 | Munroe | 108/58 |
| 3,833,132 | 9/1974 | Alduk . | |
| 3,836,018 | 9/1974 | Dawson et al. . | |
| 3,837,140 | 9/1974 | Golantsev et al. | 53/159 |
| 3,884,368 | 5/1975 | Ballard . | |
| 3,986,620 | 10/1976 | Wilde et al. . | |
| 4,030,618 | 6/1977 | Kelley et al. . | |
| 4,032,021 | 6/1977 | Mabey et al. . | |
| 4,067,456 | 1/1978 | Schmitt . | |
| 4,159,058 | 6/1979 | Zimmerman . | |
| 4,162,016 | 1/1979 | Schmitt . | |
| 4,172,686 | 10/1979 | Shorthouse . | |
| 4,195,959 | 4/1980 | Schmitt . | |
| 4,205,934 | 6/1980 | Pantin et al. | 414/77 |
| 4,230,049 | 10/1980 | Horne | 108/51.1 |
| 4,230,311 | 10/1980 | Faltin | 271/3.1 |
| 4,234,280 | 11/1980 | Donnelly et al. | 414/35 |
| 4,255,074 | 3/1981 | Meratti et al. | 414/62 |
| 4,339,220 | 7/1982 | Pulda | 414/84 |
| 4,342,531 | 8/1982 | Cox et al. | 414/46 |
| 4,383,788 | 5/1983 | Sylvander | 414/71 |
| 4,397,246 | 8/1983 | Ishida | 108/55.3 |
| 4,422,549 | 12/1983 | Werkheiser | 206/386 |
| 4,439,084 | 3/1984 | Werkheiser | 414/62 |
| 4,477,067 | 10/1984 | Wise | 270/55 |
| 4,507,348 | 3/1985 | Nagata et al. | 108/51.1 X |
| 4,671,723 | 6/1987 | Feldkämper | 414/114 |
| 4,708,247 | 11/1987 | Liebel | 206/501 |

FOREIGN PATENT DOCUMENTS 3107495 11/1982 Fed. Rep. of Germany .
54-129661 8/1979 Japan .

OTHER PUBLICATIONS

Photographs on separator sheet.

*Primary Examiner*—Michael S. Huppert
*Assistant Examiner*—Janice Krizek
*Attorney, Agent, or Firm*—Thomas D. Wilhelm

[57] ABSTRACT

A novel spacing sheet is used in place of a conventional tie sheet in layered material loads, such as pallet loads. The spacing sheet generally comprises a plurality of spaced apart surface elements and intervening channels, on its top surface, which generally facilitate handling of the material on the sheet. The channels especially facilitate removal of material from the spacing sheet. The spacing sheets are generally thicker than a conventional paper tie sheet while being thinner than a conventional pallet.

30 Claims, 8 Drawing Sheets

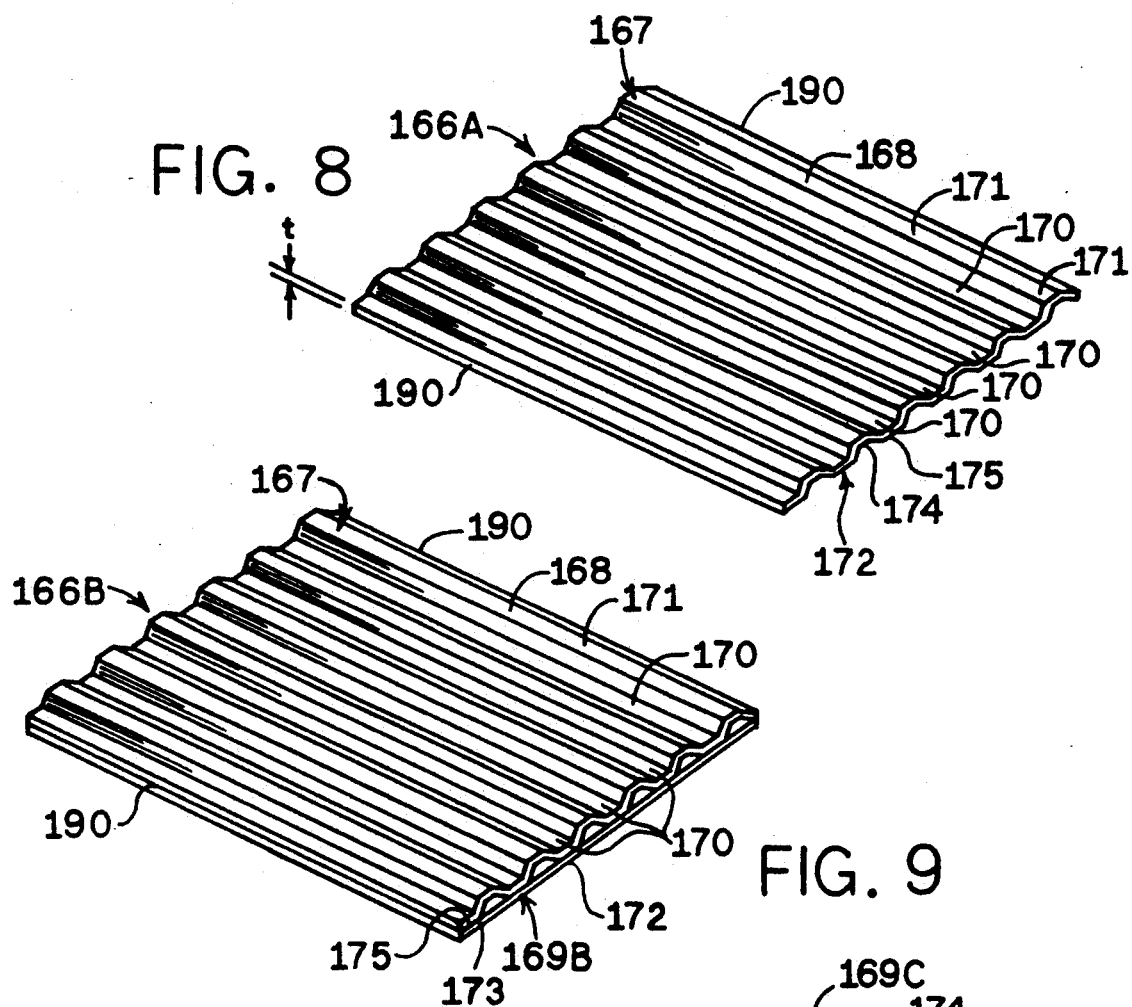
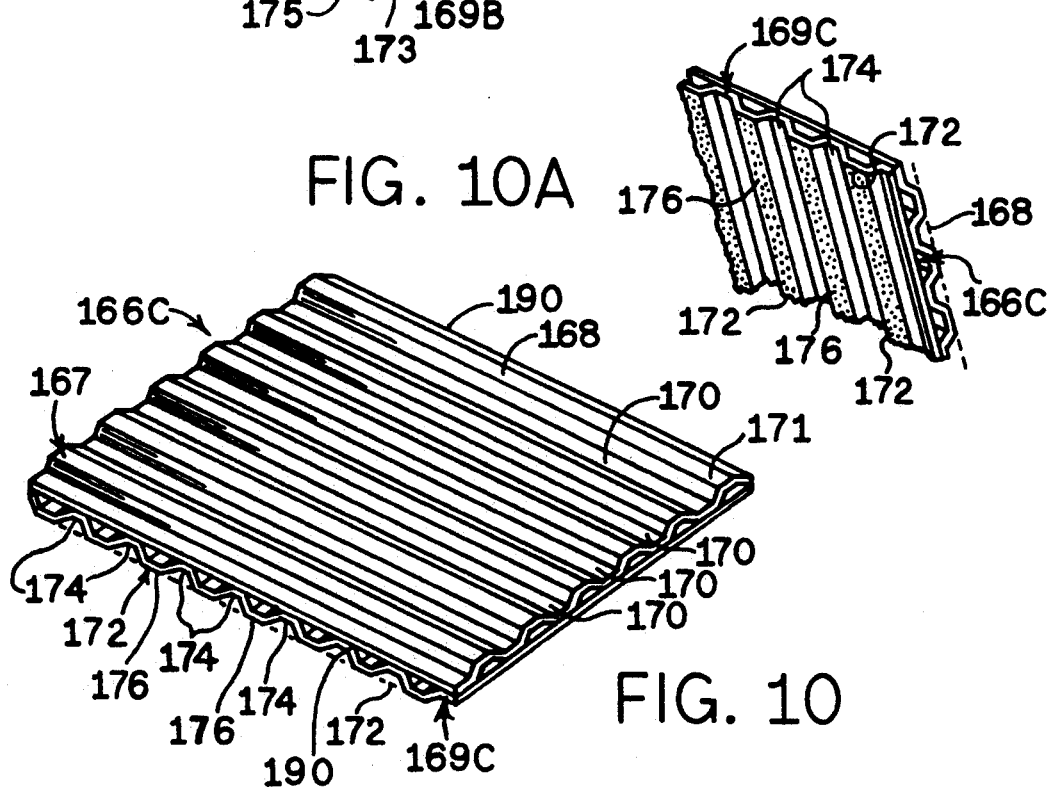

SPACING SHEET FOR HANDLING MATERIAL

This application is a Continuation-in-Part of application Ser. No. 07/449,235, filed Dec. 6, 1989, which is a Continuation of Ser. No. 07/102,386, filed Sep. 29, 1987, abandoned which is a Continuation-in-Part of Ser. No. 888,511 filed Jul. 23, 1986, all of the above being herein incorporated by reference.

BACKGROUND OF THE INVENTION

This invention relates to handling of materials in layers, and especially in layers on pallets and other supporting surfaces. It relates to palletizing materials and subsequently depalletizing those materials, all with a minimum amount of manual lifting on the part of attending labor or machine operators. The invention relates specifically to novel spacing sheets which can be used to facilitate palletizing and depalletizing of thin-section materials, and especially loose stacks of printed materials such as newspapers, signatures, sheets of paper, magazines and the like; including stacks of in-process material. Individual elements of the material may be as thin as a single sheet of paper or as thick as the respective layer as a whole. Particularly with reference to newspapers and signatures, the loose stacks are typically compressible and of uneven height.

Apparatus for palletizing boxes, cartons, or other substantially solid pieces, such as bundles of newspapers, is known in the art. A conventional palletizer for boxes or cartons may use a horizontally, reciprocally movable stripper plate for carrying boxes to a position above a pallet onto which the boxes are to be loaded. The stripper plate is then withdrawn from beneath the boxes, thereby depositing them onto the pallet. Retaining means are used for preventing the boxes from moving with the stripper plate as it is withdrawn. Such retaining means commonly include a bar which abuts the sides of the boxes facing the direction of stripper plate withdrawal.

Palletizing an depalletizing apparatus are disclosed in the following U.S. Pat. Nos.

| | |
|---|---|
| Paxton et al | 2,243,919 |
| Samler | 2,656,047 |
| Locke | 2,875,907 |
| Woodcock | 2,875,908 |
| Keyes | 2,878,948 |
| Lazott et al | 2,937,482 |
| Reed | 2,940,617 |
| Freeman | 2,978,125 |
| Magnuson | 3,105,598 |
| Gagnon | 3,149,732 |
| McWilliams | 3,157,301 |
| Jeremiah | 3,166,203 |
| Kampert | 3,257,006 |
| Bruce | 3,278,048 |
| Roth et al | 3,389,810 |
| Grasvoll | 3,594,977 |
| Larson | 3,606,310 |
| Brockmuller | 3,637,093 |
| Grasvoll | 3,648,857 |
| Carlson | 3,669,282 |
| Van Gal Jr. et al | 3,682,338 |
| Munroe | 3,720,176 |
| Alduk | 3,833,132 |
| Dawson et al | 3,836,018 |
| Golantsev | 3,837,140 |
| Ballard | 3,884,368 |
| Beal | 3,946,883 |
| Wilde et al | 3,986,620 |
| Kelley | 4,030,618 |
| Mabey et al | 4,032,021 |
| Schmitt | 4,067,456 |
| Zimmerman | 4,159,058 |
| Schmitt | 4,162,016 |
| Shorthouse | 4,172,686 |
| Schmitt | 4,195,959 |
| Pantin | 4,205,934 |
| Faltin | 4,230,311 |
| Donnelly | 4,234,280 |
| Meratti | 4,255,074 |
| Pulda | 4,339,220 |
| Cox | 4,342,531 |
| Sylvander | 4,383,788 |
| Ishida et al | 4,397,246 |
| Werkheiser | 4,422,549 |
| Werkheiser | 4,439,084 |
| Wise | 4,477,067 |
| Feldkamper | 4,671,723 |
| Liebel | 4,708,247 |
| as well as | |
| Fed. Rep. of Germany | 3,107,495 |
| Japan | 54,129661 |

In U.S. Pat. No. 4,704,060 Winski et al, herein incorporated by reference, there is disclosed palletizing apparatus for palletizing stacks of loose materials such as newspapers, signatures, sheets of paper, and the like. Winski et al disclose a plate and plate movement means, for depositing material onto a pallet or onto a partial load of material on a pallet. In that teaching, any underlying compressible materials may be compressed by the plate during the process of depositing the material. Both the material being deposited and the underlying material may be prevented from moving with the plate, by first and second projection means projecting into recessed portions of the top and bottom surfaces of the plate. The pallet load which results from loading a pallet as disclosed therein consists of a plurality of stacks extending from the underlying pallet, or a slip sheet thereon, to the upper extremity of the stack, typically the top of the pallet load. Within that environment of continuous stacks, unloading the material from the pallet is typically done by manual labor. In that process, the material is removed in a series of steps limited by the amount of material a person can manually lift at one time.

Alternatively, unloading might be done by a depalletizer wherein essentially an entire layer of the material is pushed, or swept, off the pallet at one time. The latter case of using a depalletizer is preferred in that it reduces the chance of back injury caused by excessive manual labor at the point of depalletizing, along with the associated savings in labor and medical costs.

However, conventional palletizers do not have the capability to stack loose materials such as newspaper and the like, except as disclosed in above-mentioned U.S. Pat. No. 4,704,060 to Winski et al. And to the extent newspapers are stacked on a pallet as in Winski et al, there is not any conventionally known means for removing all of the load with known pallet unloading apparatus unless the load is quite small.

One problem with handling loose materials with a pallet unloading apparatus is that each unit of the load of material on the pallet must be acted upon in some way by the apparatus, either directly or indirectly, to affect the desired movement.

A load unit is herein defined as any article, or group of articles, of the load, requiring a separate external force to cause it to move. Thus a single loose sheet of paper is a unit as is a bound bundle of papers. For assembled documents, such as newspaper or magazine, each document is generally a unit of the load.

With sheets of paper, each sheet can be a unit of the load. With the small thickness of, for example, paper, it is easy for sheets, near the bottom of a stack, to be missed by material handling apparatus which functions by action on a side of the stack, at the edges of the sheets. Yet, efficient material handling of thin sheets typically is done through interactions at the sheet edges.

Another problem with handling stacks of loose sheet materials with a pallet unloading apparatus is that only a limited stack height can be moved by pushing on a side of the stack without undue risk of toppling the stack. So some means should be provided to limit the height of an individual stack in the pallet load without the height of the individual stack determining the maximum overall amount of material which may be placed on a pallet to make up the pallet load.

It is an object of this invention to provide novel spacing sheets, and associated methods of use, which enable the stacking by a palletizer on a pallet, of thin materials such as loose papers, magazines or the like in discrete layers; such that they can subsequently be removed from the pallet, in the same discrete layers, by an appropriately configured depalletizer.

SUMMARY OF THE INVENTION

In one family of embodiments, the invention is represented by a spacing sheet comprising a top surface defining a top surface area adapted to receive a layer of material thereon, a bottom surface, a thickness between the top surface and the bottom surface, edges, and a plurality of spaced apart, upwardly open channels. The top surface comprises a plurality of spaced apart top surface elements adapted to support the layer of materials. The channels extend downwardly from the top surface elements a distance comprising at least 30%, preferably at least 40%, of the thickness of the spacing sheet. Each such channel extends from an edge along a straight line generally across that portion of the top surface which is adapted to receive the layer of material. The top surface elements define surface means adapted to contact and support an overlying layer of material over at least 15%, preferably at least 20%, and in some cases preferably at least 40% of that receiving portion of the top surface area, and to facilitate removal of the layer of material from the spacing sheet.

In some embodiments, the top surface elements, in combination, are operatively continuous and thereby effective to resist bending of the spacing sheet, from one edge across the receiving portion of the top surface.

In some embodiments, the spacing sheet has a top sheet member defining the top surface and top surface area, and a second bottom sheet member defining the bottom surface. In some such embodiments, the bottom sheet member is adapted, by securement to the first top sheet member, to resist bending of the spacing sheet. In such embodiments, the second bottom sheet member may correspond in general shape and construction to the first top sheet member, including having second channels therein, the second channels being disposed generally perpendicular to the first channels.

In some embodiments, the top surface has a first coefficient of friction "cof t" due to intrinsic properties of the top surface elements and the bottom surface has a second coefficient of friction "cof b" greater than the coefficient of friction of the top surface.

The invention further comprehends material loads made with the spacing sheets of the invention. Such loads comprise one or more layers of material, with a novel spacing sheet of the invention, or the equivalent, under each layer.

A layer is defined as the body of material which is disposed on the top surface of a given spacing sheet.

BRIEF DESCRIPTION OF THE DRAWINGS

FIGS. 8, 9, and 10 show pictorial views of novel spacing sheets of this invention.

FIG. 10A shows a pictorial view of the bottom of a portion of the spacing sheet of FIG. 10.

DETAILED DESCRIPTION OF THE ILLUSTRATED EMBODIMENTS

A palletizer 10 useful with the spacing sheets of the invention is illustrated in FIGS. 1-7 and 12. The palletizer 10 is usable for depositing layers of material, such as stacks 12 of loose newspapers on a supporting surface, such as a novel spacing sheet of this invention.

Figure 1:
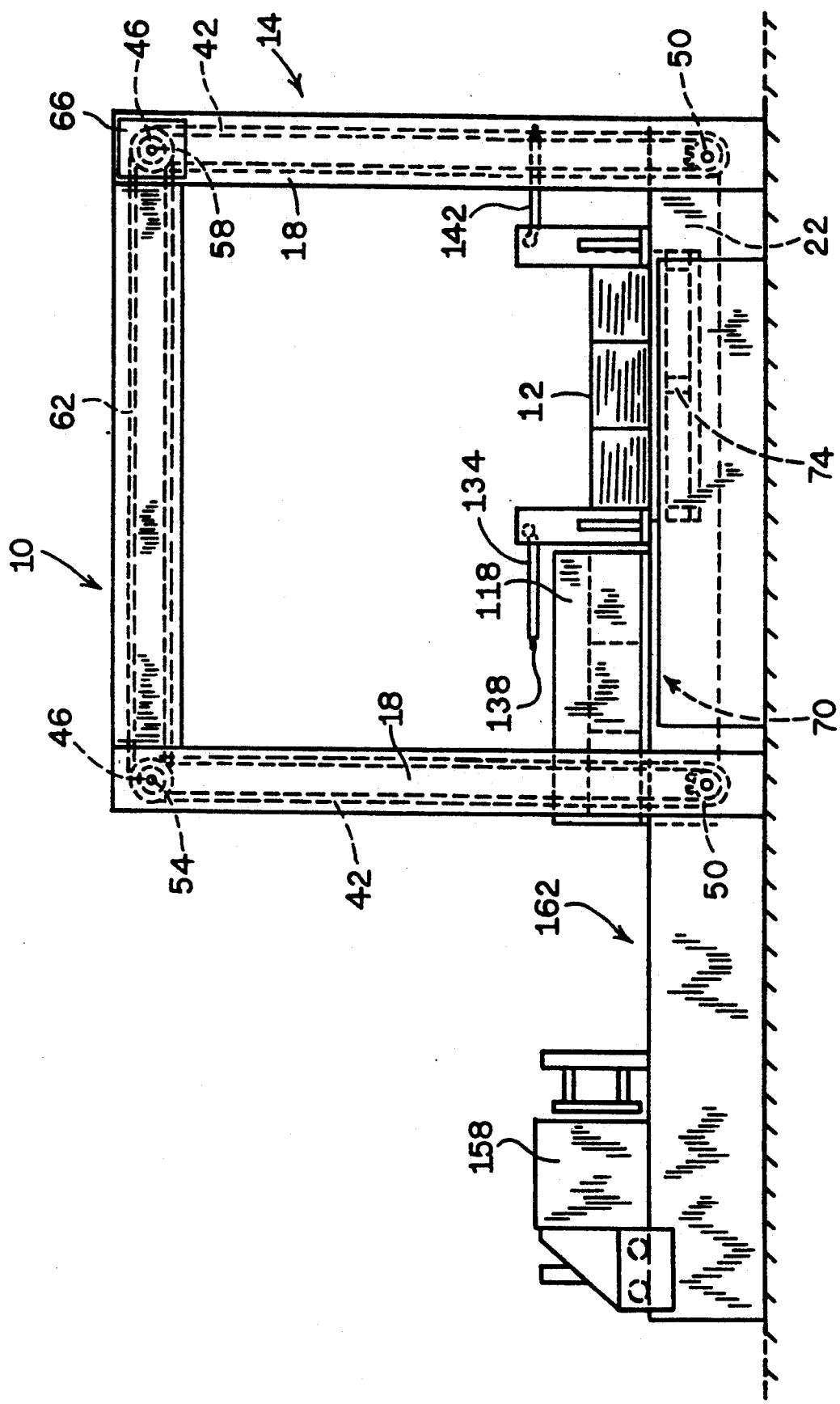
FIG. 1 is a side elevation view of a palletizer used with the novel spacing sheets of the invention.
Figure 2:
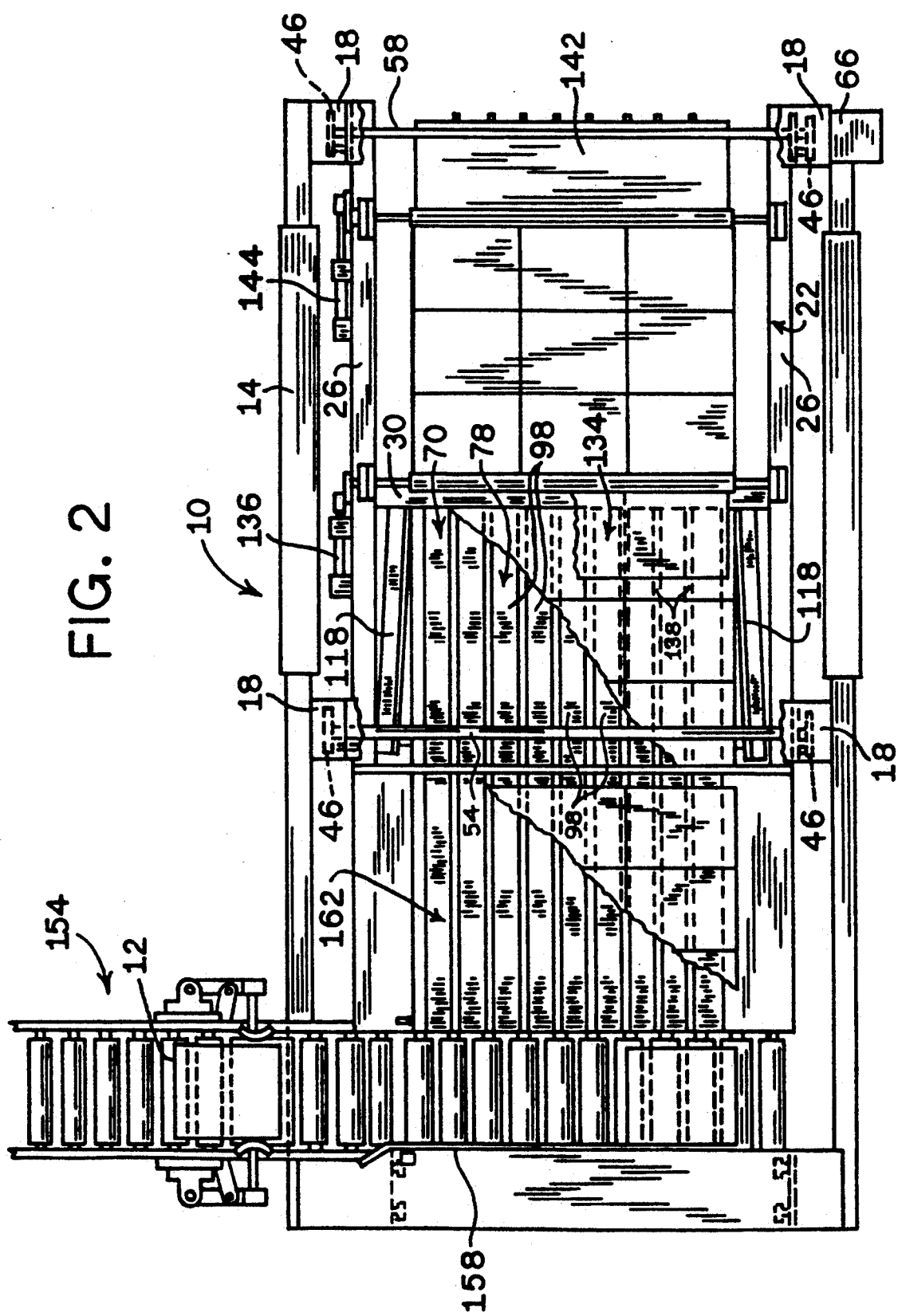
FIG. 2 is a top view of the palletizer of FIG. 1.
Figure 3:
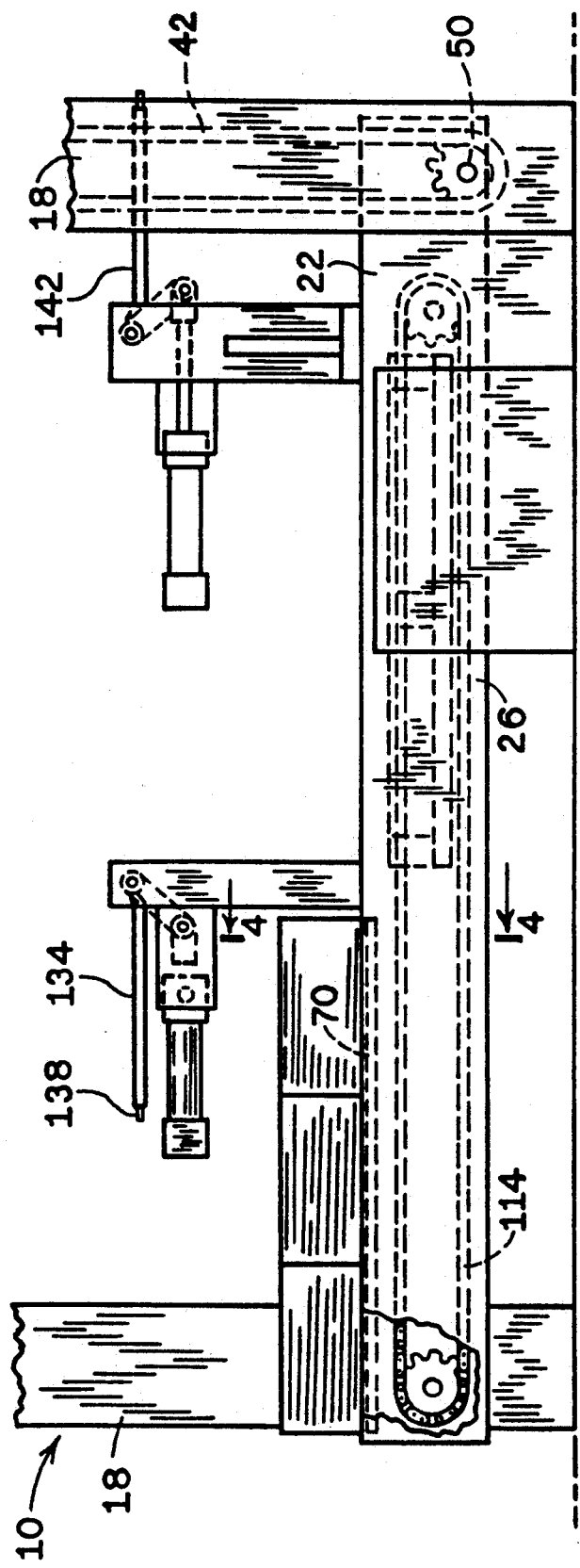
FIG. 3 is a partial side view, partially cut-away, of the palletizer of FIG. 1.
Figure 4:
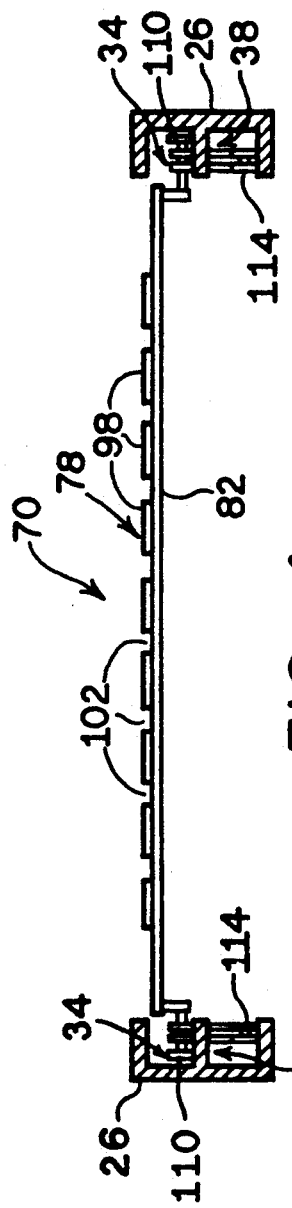
FIG. 4 is a cross-sectional view taken along line 4—4 of FIG. 3, and showing the stripper plate.

As best shown in FIGS. 1 and 2, the palletizer 10 comprises a frame 14 including four generally vertical members or posts 18 defining the corners of a rectangle. The palletizer 10 also comprises a generally rectangular, horizontally disposed carriage 22 having opposite first and second or right and left ends and four corners respectively connected to the four posts 18 of the frame 14 for vertical movement relative thereto. In the illustrated construction, the carriage 22 includes first and second generally parallel, horizontal, spaced apart side members 26, connected by a central connecting member 30. As best shown in FIG. 4, each of the side members 26 has an E-shaped cross-section and defines upper and lower channels 34 and 38 opening inwardly and having opposed upper and lower generally horizontal surfaces.

The palletizer 10 also comprises means for reciprocally, vertically moving the carriage 22 relative to the frame 14. In the preferred embodiment, the means for moving the carriage 22 vertically includes means on each of the frame posts 18 for causing relative movement of the respective corner of the carriage 22. Preferably, the means on each of the posts 18 includes an endless chain 42 connected to the respective corner of the carriage 22. As best shown in FIG. 1, each post 18 includes an upper drive sprocket 46 and a lower idler sprocket 50. Endless chain 42 is mounted around the sprockets 46 and 50. The upper sprockets 46 of the two left posts 18 (as viewed in FIG. 2) are connected by a horizontal drive shaft 54 and the upper sprockets 46 of the two right posts 18 (as viewed in FIG. 2) are connected by a horizontal drive shaft 58. Also the upper sprockets 46 of the two right posts 18 (as viewed in FIG. 2) are connected by an endless drive chain 62 to the upper sprockets 46 of the left posts 18 (as viewed in FIG. 2). Drive chain 62 is shown in FIG. 1. Drive means 66 is connected to the drive shaft 58 to drive the two right chains 42, and via the endless chain 62 and the drive shaft 54, the two left chains 42. Accordingly, the four endless chains 42 move in common, thereby causing common vertical movement of the four corners of the carriage 22.

The palletizer 10 also comprises generally horizontal stripper plate 70 mounted on the carriage 22 for reciprocal horizontal movement relative to the carriage 22 between a first or right position (FIG. 6) wherein the stripper plate 70 is adjacent the first or right end of the carriage 22 and a second or left position (FIGS. 1, 3, and 5) wherein the stripper plate 70 is adjacent the second or left end of the carriage 22. A pallet 74 is placed beneath the first position of the carriage 22 so that when the stripper plate 70 is in the first position it is above the pallet 74. The stripper plate 70 includes an upwardly facing surface 78 (FIG. 4) adapted to carry the articles or stacks of papers to be palletized, during movement of the stripper plate 70 from the second or left position to the first or right position. The stripper plate 70 also includes a downwardly facing surface 82.

Figure 12:
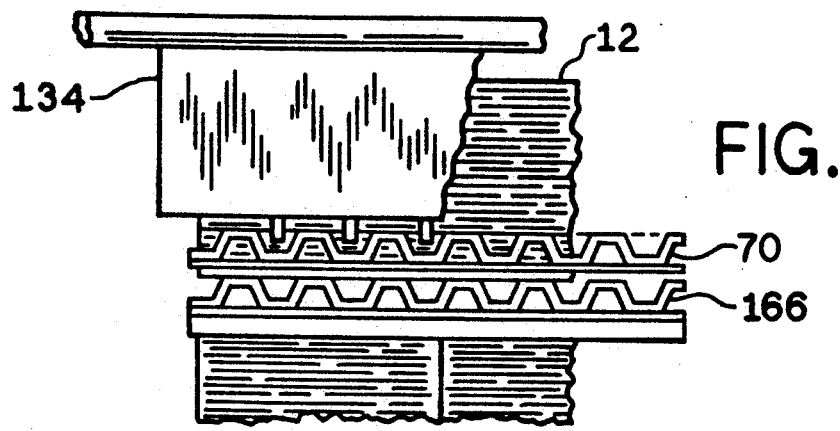
FIG. 12 is a cross-sectional view taken along line 12—12 in FIG. 7, and showing projecting fingers projecting into the channels on the top surface of the transfer plate.

Upper surface 78 has a plurality of generally parallel, spaced apart, low-friction strips 98 extending in the direction of horizontal movement of the stripper plate. The upper surfaces of strips 98 combine to define the upwardly facing surface 78 of the stripper plate 70. The spaces between the strips 98 define channels 102 in the upwardly facing surface 78. In the illustrated construction, the carriage 22 includes a pair of guide members 118 (FIG. 2) for assisting in positioning stacks of material on the stripper plate 70. A second embodiment of the stripper plate 70 is shown in FIG. 12, the cross-section thereof corresponding generally to the cross-section of spacing sheet 166B of FIG. 9, described hereinafter.

Preferably the stripper plate 70 is mounted on carriage 22 by a first pair of wheels 110 rotatably mounted on one side of the stripper plate 70 and received in the upper channel 34 of the first carriage side member 26 (FIG. 4) for rolling movement along channel 34, and a second pair of wheels 110 rotatably mounted on the right side of the stripper plate 70 and received in the upper channel 34 of the right carriage side member 26 for rolling movement along its channel 34.

The palletizer 10 further comprises means for horizontally moving the stripper plate 70 between the first or right position and the second or left position. In the preferred embodiment, the means for moving the stripper plate 70 horizontally includes, on each of the side members 26 of the carriage 22, an endless chain 114 extending through the upper and lower channels 34 and 38 and connecting to the stripper plate 70. The endless chains 114 are connected to a common drive means (not shown).

The palletizer 10 further comprises means for stopping downward movement of the carriage 22 relative to the spacing sheet. In the preferred embodiment, the means for stopping downward movement of the carriage 22 includes an electric eye 128 (FIG. 5) and associated sensor mounted on carriage 22, and means for stopping downward movement of the carriage 22 when the circuit between electric eye and the sensor is interrupted by the underlying load or pallet.

Figure 6:
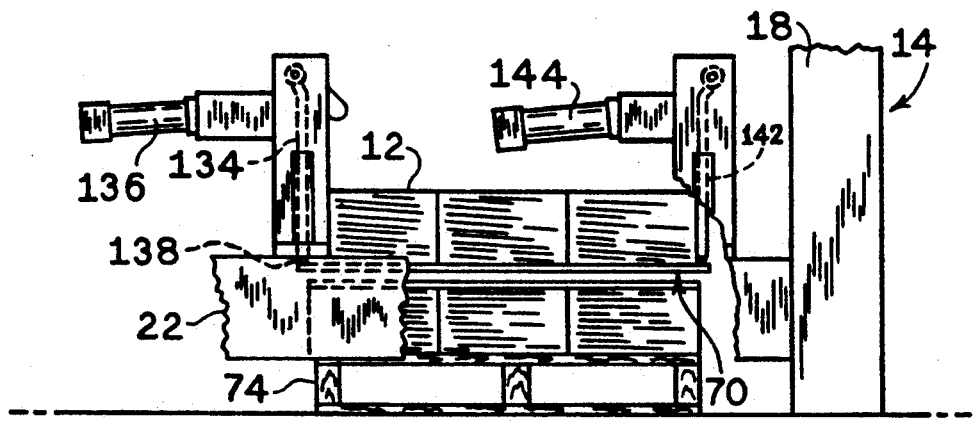
Figure 7:
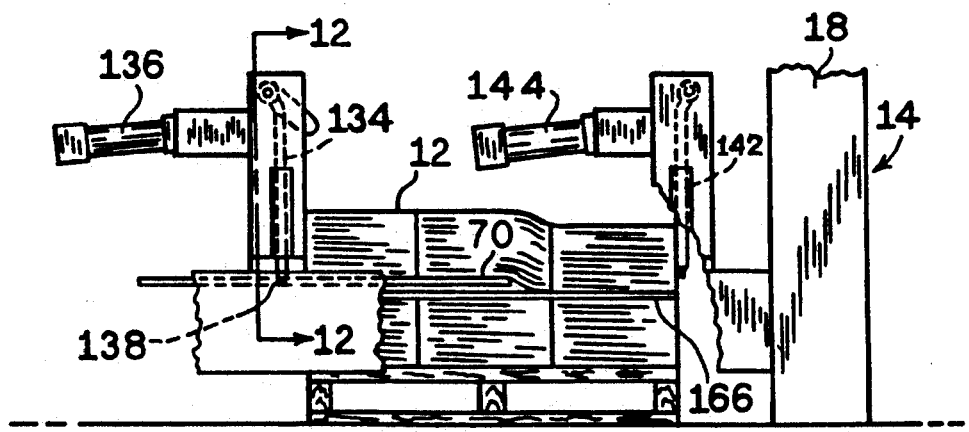

The palletizer 10 also comprises a first retaining plate 134 for preventing the layer of material which is on stripper plate 70 as in FIGS. 6 and 7 from moving with the stripper plate 70 as the stripper plate 70 is withdrawn from the first position to the second position (from right to left as in FIGS. 6 and 7). The retaining plate 134 includes projecting or combing fingers 138 extending downwardly into the recesses 102 in the upwardly facing surface 78 of the stripper plate 70 for retaining the lowermost elements of e.g. stacks of papers against horizontal movement with the stripper plate 70 as the plate is withdrawn. The extension of fingers 138 into recesses 102 is shown in FIG. 12.

In the illustrated construction, the first retaining plate 134 is pivotally moveable between a raised position (FIG. 5) wherein the plate 134 is parallel to the stripper plate 70, and a lowered position (FIG. 6) wherein the plate 134 is perpendicular to the stripper plate 70. Pneumatic cylinder 136 moves the plate 134 between the raised and lowered positions. Plate 134 and fingers 138 generally restrain the overlying layer of material as the stripper plate 70 is withdrawn.

The carriage 22 also includes a second retaining plate 142 similar to the first plate 134 for retaining the layer of papers when the stripper plate 70 is in the first or right position. Pneumatic cylinder 144 moves the plate 142 between its raised and lowered positions.

In-feed conveyor 154 (FIG. 2) extends generally perpendicular to the direction of movement of the stripper plate 70, and adjacent the left end of the carriage 22. In the illustrated construction, the conveyor 154 is a conventional roller conveyor. Other conventional types of conveyors may be selected for use with certain products. In the preferred embodiment, the palletizer 10 includes a staging station 162 (FIGS. 1-2) between the end of the in-feed conveyor 154 and the stripper plate 70 (when the stripper plate is in the second, or left, position). Staging station 162, optionally in combination with the adjacent terminal end of in-feed conveyor 154, permits an entire layer of units of material to be arranged before being pushed onto the stripper plate 70.

The rows of stacks of papers shown are moved from the in-feed conveyor 154 onto the staging station 162, and subsequently onto the stripper plate 70 by a pusher 158 which is reciprocally moveable across the in-feed conveyor 154 and the staging station 162 in the direction of movement of the stripper plate 70. In the preferred embodiment, the pusher 158 includes a plurality of fingers (not shown) extending downwardly between the rollers of the in-feed conveyor 154 to insure that all pieces of the stacks of sheet product are pushed off the conveyor 154.

The palletizer 10 is used in combination with a novel spacing sheet of this invention, generically designated as 166. Illustrative of the spacing sheets of this invention are those shown as 166A in FIG. 8, 166B in FIG. 9, and 166C in FIG. 10. The simplest embodiment of the spacing sheet is shown in FIG. 8 wherein the spacing sheet 166A comprises a single sheet element 167. The spacing sheet 166 has a top facing surface 168 which is adapted for sliding loads of material onto and off of the sheet.

The surface 168 is adequately smooth for facile sliding of paper-type products, yet not so slippery as to cause unintentional sliding which could cause spillage of the load, or even a shifting which would cause the load to be unbalanced, and thus affect safe lifting of the load without spillage. The degree of smoothness is selected to complement the properties of the lower surface of the load materials which it carries. Top surface 168 has a plurality of generally parallel channels 170 and corresponding ridges 171 extending generally across the upper surface 168.

The spacing sheet 166 also has a bottom surface 172. Bottom surface 172 defines the downwardly facing surface of the spacing sheet, which faces generally away from top surface 168. Bottom surface 172 has a plurality of channels 174 and corresponding ridges 175 extending generally across it. The top and bottom surfaces of spacing sheet 166A are generally defined at the extremities of those surfaces as they are farthest spaced from each other. Thus the top and bottom facing surfaces are physically discontinuous over the areas of channels 170 and 174, but are generally defined as the planes in which the physical upper and lower facing surface ridges reside.

Referring now to FIG. 9, the bottom sheet element 169B is a flat sheet element which is bonded to the bottom of top sheet element 167 at locations where the bottom surface 173 of top sheet element 167 contacts the top surface ridges 175 of the bottom sheet element 169B. Accordingly, the bottom surface 172 is the flat bottom surface of sheet element 169B. Sheet element 169B imparts rigidity to spacing sheet 166B by means of its inherent rigidity and by means of the I-beam affect which is created in the bonding between sheet elements 167 and 169B. Accordingly, given the same material and structure specifications for sheet element 167 in the embodiments of FIGS. 8 and 9, spacing sheet 166B is more resistant to flexing than spacing sheet 166A, and is generally preferred.

Referring now to FIG. 10, the top sheet element 167 has generally the same configuration as the sheet elements 167 in the embodiments of FIGS. 8 and 9. Accordingly channels 170 and ridges 171 extend across the top surface 168. Bottom sheet element 169C has the same shape and configuration as top sheet element 167, and can be made from the same stock material. Accordingly, the bottom surface 172 of bottom spacing sheet element 169C comprises a plurality of downwardly facing ridges 176 extending thereacross, and intervening channels 174. Ridges 176 and channels 174 extend in a direction generally perpendicular to the direction of disposition of channels 170 and ridges 171.

Figure 11:
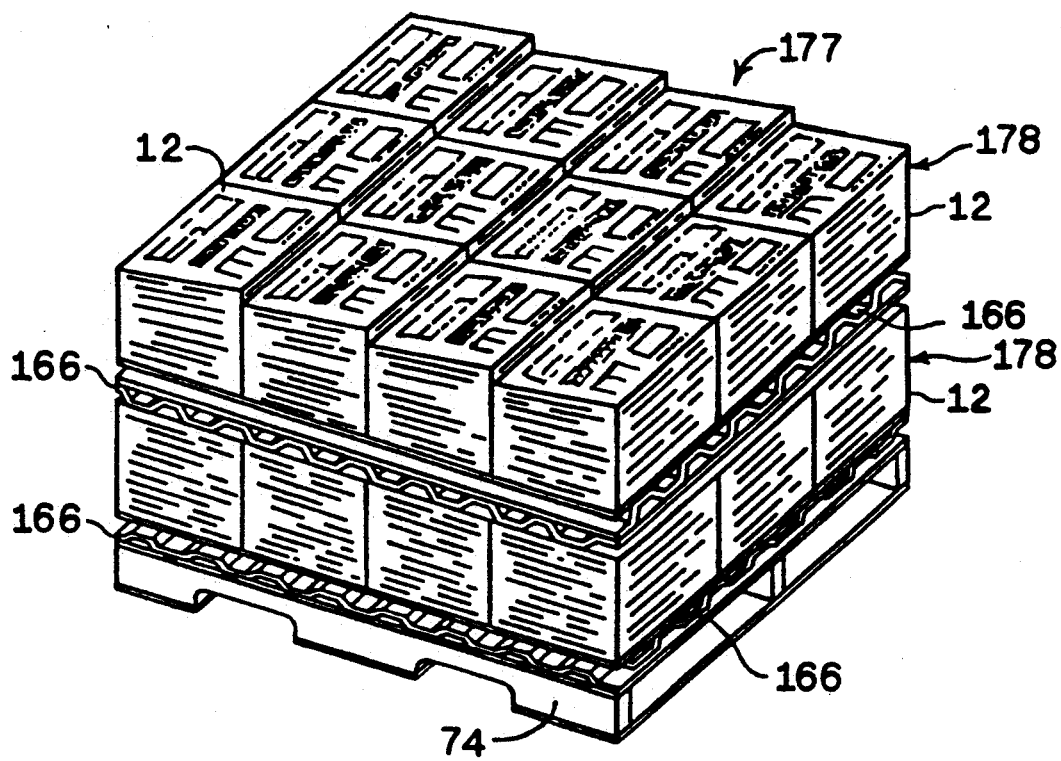
FIGS. 11 and 11A show loaded pallets incorporating the novel spacing sheets of FIGS. 10 and 10A.

Referring to FIGS. 10 and 11, in combination, it is seen that the lower surfaces of stacks 12 of sheet product have surface-to-surface contact with spacing sheet 166 at ridges 171 on its upper surface 168. Similarly, on those stacks overlain by a spacing sheet 166, the upper surfaces of the stacks have surface-to-surface contact with the corresponding sheet 166 at its ridges 176 on lower surface 172. The weight of the product overlying the respective spacing sheet applies a downwardly directed force between the product and the corresponding ridges 171. To the extent that force is distributed evenly over the surface area of the product adjacent the spacing sheet, any deformation of the product by that force is minimized. For example, if ridges 171 were narrow, for example 1 cm. wide, and channels 170 were correspondingly wider, for example 4 cm. wide, then the product could tend to deform under the force of the weight of the product, into channels 170.

With such deformation, the product would extend somewhat into channels 170, such that the elevational adjustment of fingers 138 and of retaining plate 134 would necessarily become more critical in order to ensure that the lowermost unit (e.g. sheet of paper) of the load (e.g. stacks of sheets) is removed during the depalletizing operation which is described hereinafter. While distribution of the load force over the entire surface of spacing sheet 166 is not compatible with use of channels 170, it is desirable that the surface portions of ridges 171 coincident with upper facing surface 168 constitute a significant portion of surface 168. Thus the top of the spacing sheet can be characterized in that the ridges 171 coincide with upper facing surface 168 over for example, 40% of the area of top surface 168.

As seen in FIG. 10A, ridges 176 may have projections 177 thereon. The projections may comprise roughness of the surface of the material from which the elements of the bottom surface 172 are made. They may alternately include materials adhered to the ridges 176. Typical of such materials are sand and grit, or the like, adhesively attached to the ridges 176.

In any event, it is preferred in some embodiments that the bottom surface 172 of the spacing sheet have a coefficient of friction "cofb" measurably greater than the coefficient of friction "coft" of the top surface 168. Coefficient of friction is determined by placing two similar surfaces against each other and measuring the sliding friction, due to intrinsic properties of the surfaces, as the surfaces slide relative to each other, and with a given force urging the surfaces toward each other.

In utilizing the spacing sheets of this invention, it is preferred to use a palletizer to palletize the material load and to subsequently use a depalletizer to remove the material load from the pallet. Thus, in the overall operation of the system, the desired orientation for the channels 170 during the depalletizing operation can be determined, both absolutely and with respect to the pallet, before the material is loaded onto the pallet.

The palletizer 10 operates generally as follows, with compressible load materials. A pallet 74 is placed beneath the right end of the frame 14 as shown in FIG. 1. A spacing sheet 166 is placed on the pallet 74. The spacing sheet is oriented relative to the pallet such that the channels 170 in the top surface 168 are oriented to extend in a direction compatible with the depalletizing operation. Individual stacks 12 of paper are transported to the palletizer 10 by in-feed conveyor 154 as shown in FIG. 2. When an entire row of stacks is assembled at the end of the in-feed conveyor 154, the pusher 158 pushes the row of stacks onto the staging station 162. This process continues until an entire layer of stacks of paper has been accumulated. Then, with the stripper plate 70 in the left position, or adjacent the staging station 162, and with the carriage 22 at a height such that the stripper plate 70 is generally level with the staging station 162, the pusher 158 pushes the entire layer of stacks of paper onto the stripper plate 70.

Figure 5:
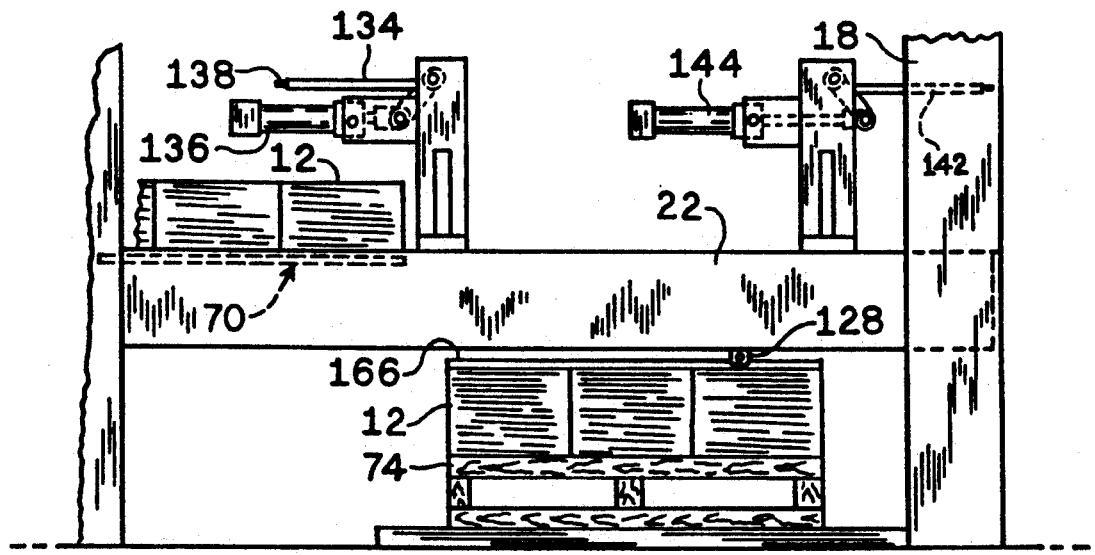
FIGS. 5-7 are enlarged, partial side views of the palletizer of FIG. 1 showing sequential operation thereof.

The carriage 22 then moves to a height above the spacing sheet 166 on the pallet (or above the spacing sheet placed on a previously deposited layer) as shown in FIG. 5 and the stripper plate 70 moves to the right, such that it is positioned above the pallet. The carriage 22 is lowered until the stripper plate 70 and its layer of material are proximate the top of the underlying spacing sheet on the underlying pallet or load. The lowering of carriage 22 is stopped when the underlying load interrupts the circuit set up through electric eye 128. This position is shown in FIG. 6. When the circuit is interrupted, the carriage proceeds downwardly a pre-set distance to bring stripper plate 70 proximate the top of the underlying load or pallet. With the retaining plates 134 and 142 in the lowered position, the stripper plate 70 is withdrawn from the right to the left, as shown in FIG. 7. As stripper plate 70 moves to the left, the friction between the top surface 78 of the stripper plate and the corresponding overlying layer of material tends to drag those respective stack elements (e.g. paper sheets) which are located adjacent the stripper plate along with the stripper plate. With the left retaining plate 134 lowered, the fingers 138 project into channels 102 in the stripper plate 70, and the combination of retaining plate 134 and fingers 138 prevents even the lowermost ones of the sheets in the stacks of papers on the stripper plate 70 from moving with the stripper plate. Also as the stripper plate 70 moves from right to left, the stacks 12 of material drop down onto the underlying spacing sheet 166, as shown in FIGS. 7 and 12. When the stripper plate 70 reaches the left position, the retaining plates 134 and 142 are returned to the raised position and the carriage 22 is returned to the position in which the stripper plate 70 is level with the staging station 162. The above steps are repeated until the pallet is as full as desired.

When the desired quantity of material has been loaded onto the pallet, and wherein each layer of the material is underlain by a spacing sheet 166, the pallet load 177, including pallet, spacing sheets, and layers of material, is removed from the palletizer. The pallet load 177, as it leaves the palletizer, appears typically as seen in FIG. 11; in which each layer 178 is underlain by a spacing sheet 166, and the bottom spacing sheet is supported by the pallet 74. Where other support means is available, pallet 74 can be eliminated. Also, the bottom spacing sheet can be eliminated if the pallet contains the requisite channels. Such a pallet is taught in U.S. Pat. No. 3,720,176 Munroe, herein incorporated by reference.

Figure 11A:
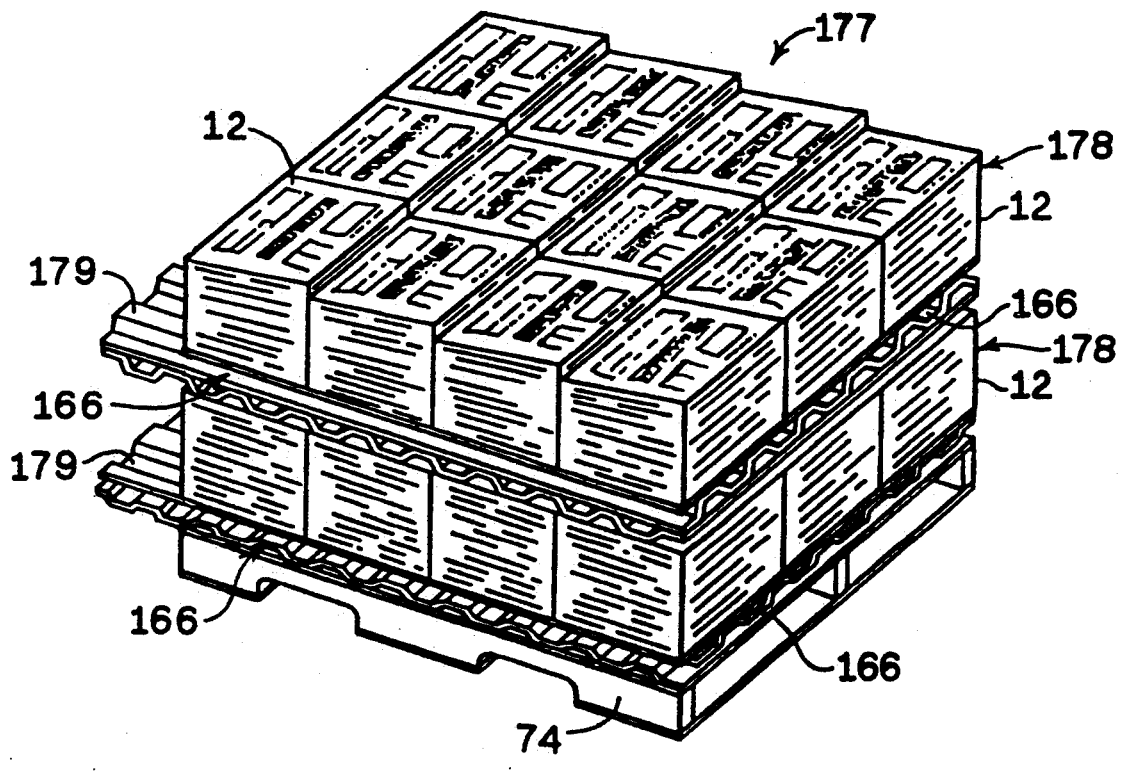

In some lesser preferred embodiments, the spacing sheet 166 is intentionally longer in one dimension than the layers of material placed on it, as seen in FIG. 11A. Accordingly, an edge 179 of the spacing sheet can extend from each layer of material on the load. Edge 179 can be grasped by grasping means, not shown, thereby preventing movement of the spacing sheet while the respective overlying layer 178 is being removed.

It is important that the spacing sheet 166 be compatible with use in both the palletizer and the depalletizer equipments, such as the equipments seen in FIGS. 1-7 and 12, and 13-15. Referring now to FIG. 11, it is seen that channels 170 in the upper spacing sheet 166 are oriented in the same direction as channels 170 in the lower spacing sheet 166. It will be seen hereinafter that the orientation of channels 170 facilitates the removal of the layers of material from the pallet. In some cases, all the spacing sheets 166 have their channels oriented in the same direction as seen in FIGS. 11 and 11A. In other cases, the layers of material on a given pallet 74 may be oriented in differing directions.

In one contemplated use of the spacing sheets of the invention, the product, or stacks of material 12, is palletized in layers 178 in one manufacturing or handling facility and is shipped to another facility, such as another factory or warehouse, before it is depalletized. In another embodiment, the purpose of palletizing is for temporary storage, or warehousing, with subsequent depalletizing in the same facility. In some cases, manipulation of load material on the pallet load 177 may take place while the material is on the pallet. In any event, at some point, it is usually desirable to remove the material from the pallet. The removal process usually takes place at a location different from the location of palletizing. Namely the depalletizing usually takes place at a depalletizer, such as the one seen in FIGS. 13-15.

Figure 13:
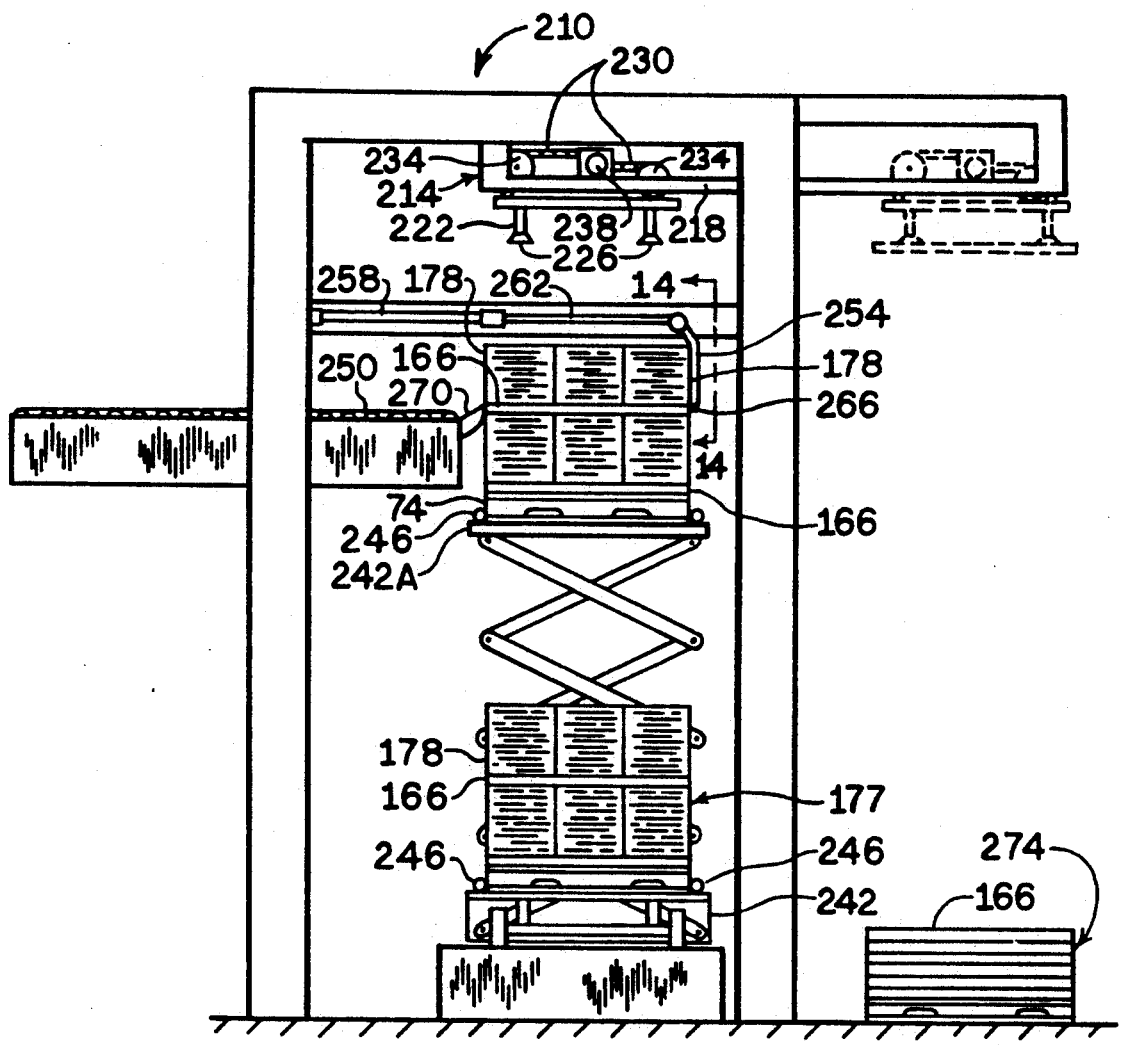
FIG. 13 shows a side elevation view of a depalletizer used in the invention.
Figure 14:
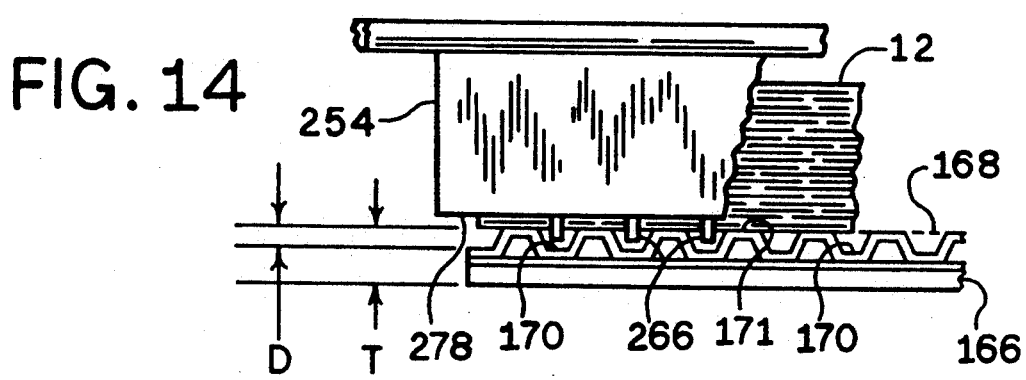
FIG. 14 is a partial elevation view taken at 14—14 of FIG. 13, and showing projecting means projecting into the channel means in the top surface of the spacing sheet.
Figure 15:
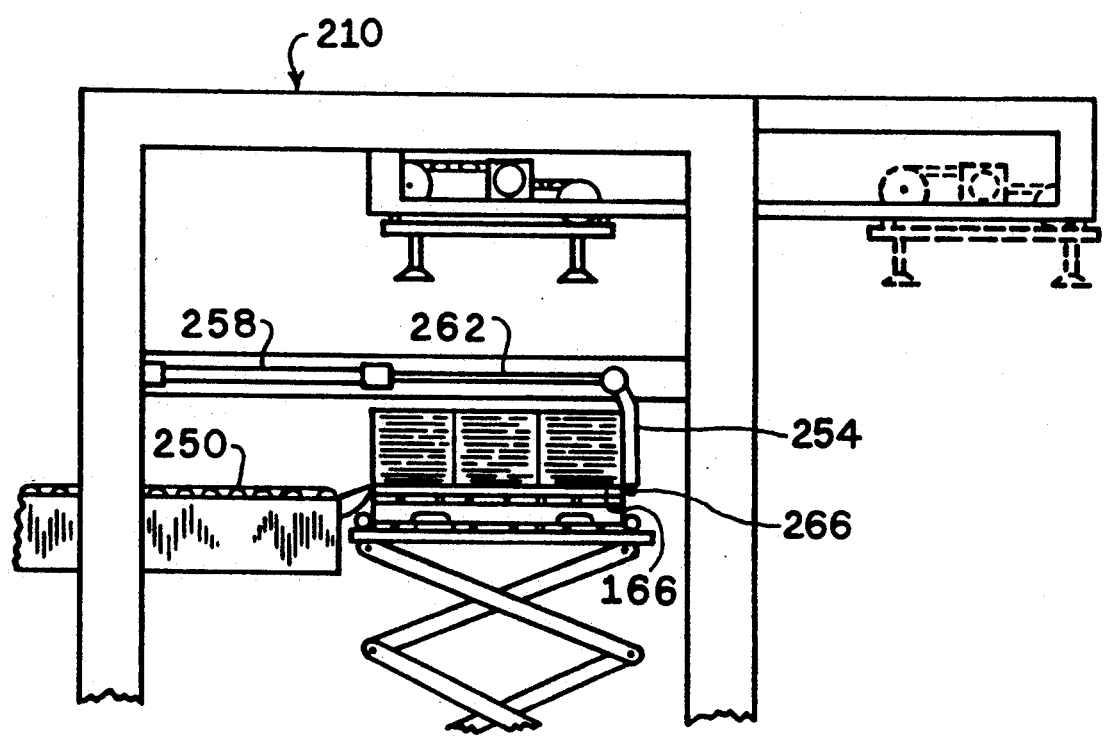
FIG. 15 is a partial side elevation view as in FIG. 13 with the pallet having been further raised for removal of the bottom layer of material.

It will be appreciated that many of the structural components of the palletizer 210 of FIGS. 13-15 are similar to corresponding structural components of palletizer 10 of FIGS. 1-7 and 12. Accordingly, a palletizer may be designed to also perform the depalletizing operation, when fitted with appropriate adaptations and operating controls. In the event the palletizer being used is capable of performing the depalletizing operation, then the locations of the palletizing and depalletizing operations can be the same.

Referring now to FIGS. 13-15, a spacing sheet removal apparatus 214 includes a primary remover frame 218 and a pickup framework 222 including suction cups 226. Pickup framework 222 is suspended from frame 218. Chains 230 extend upwardly from framework 222 over pulleys 234 to motor 238. Motor 238 dispenses and winds up chains 230 in raising and lowering pickup framework 222. Pickup framework 222, chains 230, pulleys 234, and motor 238 are slidably mounted on frame 218 such that they can be moved along frame 218, such as to the phantom position shown in FIG. 13.

A depalletizing operation will now be described in sequence.

A pallet load 177 is placed onto a pallet table 242 as seen in FIG. 13. FIG. 13 shows one pallet table 242 lowered, and a second pallet table 242A raised, as described hereinafter. Any means may be used in lifting table 242, including a chain suspension as for carriage 22 in palletizer 10 of FIG. 1. The ordinary guards and lateral stabilizers have been omitted for ease of visualizing and understanding the operations of both the palletizer 10 and the depalletizer 210.

The pallet is positioned on the pallet table through engagement of stops 246. If the respective pallet table 242 on which the pallet has been loaded is not horizontally adjacent removal conveyor 250, such that it can be raised to a position directly adjacent the removal conveyor, then the pallet table 242 is moved laterally in the appropriate direction to bring the pallet into a position horizontally adjacent removal conveyor 250.

Once the loaded pallet and its pallet table have been brought into a position horizontally adjacent removal conveyor 250, the height of the respective pallet table 242 and the pallet with its load, is adjusted by raising pallet table 242 such that the load is indexed into a position directly and physically adjacent removal conveyor 250 as seen at 242A in FIG. 13. In that position the bottom of the top layer 178 is more or less level with the top of removal conveyor 250. Preferably the bottom of the top layer 178 is slightly above the plane of the top of conveyor 250. Pusher 254 is then moved into a vertical position as shown in FIG. 13.

Cylinder 258 is activated, withdrawing rod 262 and thereby drawing pusher 254 with it, thus pushing the top layer 178 off the load and onto the removal conveyor 250. As pusher 254 pushes the layer 178 off, fingers 266 extend below the bottom of the layer and into channels 170 on the spacing sheet 166, to ensure that the bottom members of the layer are moved concurrently. See FIG. 14.

While contents of the pallet are being pushed off, retainer 270 abuts spacing sheet 166 along the corresponding edge of the spacing sheet which is indexed adjacent conveyor 250. The layer 178 is pushed toward retainer 270. Retainer 270 prevents the spacing sheet, and the rest of the load, from being displaced laterally while the overlying layer 178 is being pushed off. It is important that the load be properly indexed adjacent retainer 270 such that retainer 270 is able to prevent substantial movement of materials underlying the layer being pushed off. Where loose material, such as stacks 12 of sheet product, are being depalletized, restraint of particularly the uppermost sheets underlying the spacing sheet is needed. These layers are readily restrained by so indexing spacing sheet 166 adjacent retainer 270 that spacing sheet 166 transfers the residual pushing stress to retainer 270 as seen in FIG. 13. In that regard, the pushing stress is transferred by friction, from the load being pushed off, to spacing sheet 166, and by abutment with retainer 270, from spacing sheet 166 to retainer 270. The layers of material underlying spacing sheet 166 experience minimal, if any, stress from the pushing action, thus not requiring direct edge restraint contact.

In order for retainer 270 to act appropriately on a spacing sheet, the spacing sheet must have enough thickness and rigidity that it can be positioned in surface-to-surface contact with retainer 270 and maintain that contact while the overlying layer of material is being removed; without slippage, or buckling, or other damage to the spacing sheet or retainer. Concurrently, the top surface 168 of the spacing sheet should be level with, or above, retainer 270 to permit sliding the load contents from the top surface 168 of spacing sheet 166, over retainer 270, and onto conveyor 250. A minimum thickness "T" (FIG. 14) for spacing sheet 166 for use with retainer 270 is thus about 0.25 inch. Thinner spacing sheets can be used, especially with other means to restrain the sheet during depalletizing, but the difficulty in satisfactorily locating a thinner sheet vertically with respect to retainer 270, thereby indexing it, makes their use difficult therewith. A spacing sheet having a thickness of 0.375 inch is better for use with retainer 270. 0.75 inch is preferred. Thicknesses as high as 1 inch are contemplated as being practical. Thicknesses greater than 1 inch will work, but spacing sheets of those designs will be more costly and would generally unnecessarily increase the height of the pallet loads in which they are used. The thickness "T" is thus typically no greater than about 1-2 inches.

The thickness of the spacing sheet is less important regarding indexing with respect to conveyor 250 where means other than abutment with retainer 270 are used to restrain the underlying spacing sheet 166 and the underlying pallet or layer during the depalletizing operation. For example, grit on bottom ridges 176 (FIG. 10A) can restrain movement of the spacing sheet relative to a more stable underlying layer. As another example, the extended edge 179 of the spacing sheet 166 can be grasped in the depalletizer, thereby restraining the spacing sheet while the overlying layer is being removed. Accordingly, a variety of means of restraining the spacing sheet during removal of the overlying material are available for use if and as needed.

After the top layer is removed, pallet table 242A is raised to an appropriate height for removal of the underlying layer. Pickup framework 222 of spacing sheet remover 214 comes down to the top spacing sheet 166 and picks it up by suction cups 226. After spacing sheet 166 is adequately raised, it is moved laterally away from the pallet load as seen in phantom in FIG. 13 and is lowered onto the stack 274 of spacing sheets.

After the top spacing sheet has been removed, pusher 254 pushes the remaining layer 178 off the pallet in a manner similar to the pushing off of the previous layer, and as shown in FIG. 15. The remaining spacing sheet 166 is removed as described above, if desired. The previous steps of adjusting the height, pushing off one layer at a time, and removing its underlying spacing sheet, are repeated as necessary, to remove the desired amount of material from the pallet.

The palletizer of FIGS. 1 and 2 can incorporate therein a spacing sheet positioner essentially identical to the spacing sheet remover 214 of depalletizer 210; and which is powered and controlled to place spacing sheets on the pallet load in a process which is the reverse of the spacing sheet removal in the depalletizer.

This invention essentially revolves about spacing sheet 166, and the ability to so orient the spacing sheet 166 that material can be put onto the spacing sheet in the palletizer by first automatic means and can then be removed from the spacing sheet in the depalletizer by second automatic means; such that materials can be loaded onto the pallet, and later removed from the pallet, all without the necessity of the materials being physically handled by a machine operator or a laborer.

In a preferred embodiment of the overall process of palletizing, followed by depalletizing, and one which is used to handle pallet loads of loose stacks of newspapers, a spacing sheet 166 is placed on the pallet in the palletizer with its channels 170 oriented in a direction predetermined for ease of unloading the material from the spacing sheet in the anticipated subsequent unloading environment. A layer of loose stacks of newspaper is then placed on the spacing sheet. A second spacing sheet is placed on the top of the so-placed layer of newspapers. The second spacing sheet is similarly oriented in a direction predetermined for ease of unloading material from the second spacing sheet. The weight of the (second) overlying spacing sheet 166 is normally adequate to compress the underlying layer to bring the top of that layer to a uniform height. After the second spacing sheet has been placed, with proper orientation, a second layer of loose stacks of newspapers is placed on the second (overlying) spacing sheet.

This sequence is repeated until the desired number of layers has been placed on the pallet to thereby create the pallet load. The pallet load of material is then placed in storage.

At the time when the material on the pallet is to be further used or worked on, the loaded pallet is brought out of storage and is transferred to the depalletizer 210 where the load is removed from the pallet as hereinabove described.

All the above activity of palletizing and depalletizing can take place without any manual labor of lifting material onto the pallet or off of the pallet. In a highly automated system the multiple step process of removing the loaded pallet from the palletizer, storing it, and subsequently retrieving it from storage and delivering it to the depalletizer can also be performed without any human intervention other than operation of the controls of conventional material handling storage and retrieval apparatus.

Indeed, in a fully automated environment, the loads are handled, and thus supported, between the time they leave the palletizer and the time they enter the depalletizer, entirely by automatic conveying means, whereby the support means obviously both supports the loads and participates in moving them from place-to-place. In that case, there is never any need to insert a lifting means under the load (i.e. fork lift forks), and so the pallet can be dispensed with and the load can be built on a spacing sheet, such as at 166, having sufficient rigidity to support the load.

In less automated embodiments, the pallet load of material may be picked up from the output area of the palletizer, as, for example, by a forklift, and transported to the storage location. The forklift may also be used to transport the pallet load from storage to the depalletizer or other work location.

As indicated above, it is preferred that the spacing sheets be oriented, at the time they are made part of the pallet load, in a direction to readily accommodate the preferred direction of unloading of each of the spacing sheets, in a given load, in the depalletizer. In the alternative, the spacing sheets may be incorporated into the pallet load without regard to the direction of unloading in the depalletizer, so long as the layer on each spacing sheet is compatible with sliding in the direction of the channels 170 in upper surface 168. To the extent the channels 170 are not aligned in the palletizing operation, for direction of unloading, the pallet may then be rotated/oriented prior to removing the material from the spacing sheet, to properly align the channels 170 for the depalletizing operation.

With respect particularly to using the spacing sheets of this invention depalletizing operations which embody sliding the load material off the corresponding ridge and channel surface, it is necessary that the ridge segments 171 of supporting surface 168, which are in contact with the load material have a sufficiently low coefficient of friction with respect to the load material that the load material can readily be pushed off the supporting surface with a modest amount of force, as by pusher 254. As the functional coefficient of friction depends not only on surface 168, but also on the characteristics of the load being carried, the absolute measured coefficient of friction for any given surface 168 varies as an engineering adjustment to the characteristics of the load to be carried. Thus the term "low coefficient of friction" is defined as that surface friction characteristic which readily accommodates the sliding removal of the carried load.

This completes the general description of the preferred use of the spacing sheets of this invention in the team of machines comprising the palletizer 10 and the depalletizer 210 as a system; and where the material is palletized and subsequently depalletized mechanically, without the requirement to use any manual lifting labor.

Within the context of this invention a layer may be fairly thin, or could be relatively thick. The spacing sheets of the invention are especially useful for palletizing articles less than 1 inch thick, especially less than 0.5 inch thick, most especially less than 0.25 inch thick. While thicker materials can readily be handled, the special features of this invention are most easily recognized in handling the thinner material.

Also within the context herein, a pallet load may consist of a single layer (or part of a layer), or it may have two or more layers.

Referring again to FIGS. 8-10 and 10A, the ridges 171 generally contact and support the overlying layer 178 over at least 15% of that portion of the top surface 168 which underlies the layer 178. This minimum support fraction is especially important where the material of layer 178 is flexible and can protrude into the channels 170. As the width of ridges 171 is increased, thereby increasing the ridge fraction of the top surface of the spacing sheet, the tendency of the overlying material to protrude into channels 170 diminishes, while the difficulty of aligning fingers 266 of the depalletizer with channels 170 increases accordingly. So, the ridges generally occupy between about 15% and about 70% of the area of top surface 168 which underlies a layer. In preferred spacing sheets, the ridges correspond to between about 20% and about 40% of the top surface 168 which underlies a layer.

The spacing sheets of this invention are generally thicker, between the top surface 168 and the bottom surface 172, than conventional tie sheets, and are thinner than conventional pallets; and contain desirable features of each. Conventional tie sheets are up to about 0.100 inch thick and can be flexed, bent, and creased like conventional paper. Typically the surface of a tie sheet has a low coefficient of friction such that a layer can be slid off it. Conventional pallets are relatively rigid and heavy, compared to tie sheets, whereby they contribute stability and rigidity to the load, and they resiliently flex, but do not fold or crease when subjected to bending loads encountered in typical material handling operations.

The spacing sheets of this invention are sturdy and resist substantial flexing like pallets do. Namely the spacing sheets cannot be folded and creased when subjected to typical material handling forces. The spacing sheets are relatively thin and provide good sliding surfaces like tie sheets. The combined channels and ridges therein support the overlying layer while providing means to accommodate the fingers 266 on pusher 254 for depalletizing. The depth "D" of channels 170 in the spacing sheet 166 (e.g. 166A, 166B, or 166C) is at least 25% of the thickness "T" between the top surface 168 and the bottom surface 172. In the spacing sheet embodiment 166C of FIG. 10, the depth "D" is typically about 30% to about 45% (and all percentages in between) of the thickness "T".

In the spacing sheet embodiment 166B of FIG. 9 wherein a flat sheet element 169B is overlain by the sheet element 167 having the ridges and channels, the depth "D" is typically greater than 50% of thickness "T", up to about 90% of the thickness "T", and is generally determined by the thicknesses of the sheet elements 167 and 169B.

In the spacing sheet embodiment 166A of FIG. 8 wherein the sheet element 167 defines both top surface 168 and bottom surface 172, the depth "D" typically represents at least 70% of thickness "T."

The embodiments of FIGS. 8, 9, and 10 each have advantages. The embodiment of FIG. 8 is the simplest and potentially most economical. But it is less rigid than the other embodiments for a given thickness "t" of the sheet element 167. The embodiment of FIG. 9 is more rigid than the sheet of FIG. 8, but it is generally more costly to produce because of using two sheet elements 167 and 169B and an additional processing step to join them. The embodiment of FIG. 10 is the most rigid embodiment shown, but is also potentially the most costly because its second (lower) sheet element 169C is corrugated. The embodiment of FIG. 10 is also generally the thickest embodiment as shown.

In general, sheet 166A derives its flex resistance between side edges 190 from the thickness "t" of the material used in making sheet element 167. Sheet 166B derives its flex resistance between side edges 190 primarily from the bonding of sheets 167 and 169B. Upward flexing of edges 190 is generally strongly resisted, while downward bending of side edges 190 is less strongly resisted. Sheet 166C derives its flex resistance from both (i) the bonding of the sheets 167 and 169C to each other and (ii) the perpendicular arrangement of the ridges 171 and 176 relative to each other. As suggested by FIGS. 8-10 and 10A, flex resistance of the spacing sheet 166 along the longitudinal direction of the sheet (e.g. along ridges 171) is provided by the ridges 171, and in FIGS. 10 and 10A also by ridges 176.

While ridges 171 and 176 are shown as continuous, ridges 171 and 176 can have discontinuities so long as the ridges are cooperatively continuous, to thereby effectively resist bending. Cooperative continuity typically exists where a first ridge, adjacent a discontinuity on a second ridge, is continuous adjacent the discontinuity over the length of the discontinuity, and for an additional distance at least as long as the discontinuity in both longitudinal directions therefrom.

The top surface 168 of spacing sheet 166, and the bottoms of channels 170, define first and second planes, respectively, and remain in the defined first and second planes with only minor deviations therefrom at all conditions of use of the spacing sheet with a load layer. In direct relationship therewith, the bottom surface of stripper plate 70 defines a third plane. Further, the edge 278 of pusher 254 defines a fourth plane adjacent and above the first plane of surface 168 as the pusher pushes the layer of material off the spacing sheet 166. Finally, the ends of fingers 266 on pusher 254 define a fifth plane adjacent and above the second plane of the bottoms of channels 170 as the pusher pushes the layer off the spacing sheet.

Referring to FIG. 12, the configuration of surface 168 (first plane) must thus be sufficiently planer to accommodate close but spaced positioning of the bottom of stripper plate 70 over top surface 168 when a layer is being deposited on it as in FIGS. 6 and 7. Excess deviation therefrom (a) will cause contact between stripper plate 70 and spacing sheet 166 which can cause undesirable horizontal movement of spacing sheet 166 as stripper plate 70 is withdrawn, or (b) will require using an undesirably large space between top surface 168 of the spacing sheet and bottom surface 82 of the stripper plate when a layer is being deposited.

Referring to FIG. 14, the edge 278 of pusher 254 is spaced from top surface 168 (first plane) by about the same distance that the ends of fingers 266 are spaced from the bottoms of channels 170 (second plane). Accordingly any deviations of spacing sheet 166 from a planar configuration affects the above spacings. Thus the first and second planes must provide clearance with respect to the fourth and fifth planes as the layer is being pushed off the spacing sheet by pusher 254.

The spacing sheets of this invention are generally rigid enough (resist flexing) that they define and maintain their required configurations of planarity at all conditions of use in the palletizer and depalletizer with respect to the above described third, fourth, and fifth planes. Thus, the spacing sheets of this invention maintain the required degree of planarity (i) when lying horizontal on a generally flat surface but supporting no load, (ii) when receiving a layer as from stripper plate 70, (iii) when supporting an overlying layer, and (iv) when the overlying layer is being removed. The sheet elements 167, 169B and 169C can be made with a variety of sheet materials so long as they are sturdy enough to support the load to be carried, and can support a surface adapted to facilitate removal of the material load. The preferred surface for sliding removal facilitates sliding with a low coefficient of friction. Where the load is removed by a pick-and-place operation, as by sliding fingers horizontally into channels 170 under the load and thus lifting the material off the spacing sheet 166, a low coefficient of friction of especially ridges 171 is not as important, and indeed can be less preferred.

Any material having sufficient strength, rigidity, and surface properties can thus be used for the sheet elements 167, 169B, and 169C. A common such material for sheet elements 167 and 169C is corrugated metal sheet such as corrugated roofing. When using such material in sheet 166B, the bottom sheet element 169B can be flat sheet metal of the same or similar gauge, thickness as sheet element 167. In sheet 166C, the top and bottom sheet elements 167 and 169C are typically made with common sheet stock.

Another suitable material is plastic such as polystyrene, polyethylene, (for example high density polyethylene sheet), or polypropylene.

Thus it is seen that the invention provides novel spacing sheets, and associated methods of use, which enable the stacking by a palletizer, on a pallet, of thin materials such as stacks of loose papers, magazines or the like in discrete layers; such that they can subsequently be removed from the pallet, in the same discrete layers, by an appropriately configured depalletizer.

Materials which can be palletized and depalletized using only conventional pallets and conventional tie sheets can also be handled on the spacing sheets of the invention.

The invention is especially adapted to handling products, or product elements or subassemblies, which need in-process storage, or temporary storage before shipment.

The invention further provides novel pallet loads, and material loads built only on the spacing sheets (without pallets), all especially advantageous for use in handling material, especially in automated processes for handling materials.

Throughout this description, and in the following claims, the terms "pallet" or "pallet load" are used with reference to a combination of supported layers of material with underlying spacing sheets 166. It shall be understood that a conventional pallet as at 74 need not be included as long as each layer is underlain by a spacing sheet 166 and the bottom spacing sheet 166 is supported on a supporting surface such as a floor, a shelf, or any supporting conveyor, etc. Accordingly, the conventional pallet 74 is no more than a convenient descriptor for an accommodating supporting surface; whereby a pallet is a mobile support, a conveyor is a transporting support with defined transport path, and a floor or shelf are fixed supports. And where the bottom support (e.g. pallet) has a convoluted surface as at ridges 171 and channels 170, and can present that convoluted surface to pusher 254 on other depalletizing means for cooperative depalletizing thereof, the use of a spacing sheet 166 under the bottom layer of the load is obviated.

While the invention has been described above with respect to its preferred embodiments, it will be understood that the invention is susceptible to numerous rearrangements, modifications, and alterations, without departing from the spirit of the invention. All such arrangements, modifications, and alterations are intended to be within the scope of the appended claims.

Having thus described the invention, what is claimed is:

1. A spacing sheet for supporting a layer of material thereon, said spacing sheet comprising:
   (a) a plurality of spaced apart top surface ridges adapted to contact and support the layer of material, and a top surface comprising the totality of said top surface ridges;
   (b) a bottom surface, adapted to contact and interface with an underlying support;
   said top and bottom surfaces defining opposing extremities, and thereby a thickness, of said spacing sheet, said thickness being between 0.25 inch and 2 inches;
   (c) edges; and
   (d) a plurality of spaced apart, upwardly open channels disposed between said top surface ridges
   said channels extending downwardly from said top surface, each said channel extending from one of said edges along a straight line across said top surface, said channels extending from said top surface downwardly a distance comprising at least 30% of the height of said thickness of said spacing sheet, said top surface ridges being adapted to contact and support the layer of material over at least 15% of that portion of said top surface which underlies the layer.

2. A spacing sheet as in claim 1 wherein said top surface ridges occupy at least 20% of said area of said top surface.

3. A spacing sheet as in claim 1, said top surface ridges, in combination, being operatively continuous and effective to resist bending of said spacing sheet.

4. A spacing sheet for supporting a layer of material thereon, said spacing sheet comprising:
   (a) a plurality of spaced apart top surface ridges adapted to contact and support the layer of material, and a top surface comprising the totality of said top surface ridges;
   (b) a bottom surface adapted to contact and interface with an underlying support;
   said top and bottom surfaces defining opposing extremities, and thereby a thickness, of said spacing sheet, said thickness being between 0.25 inch and 2 inches;
   (c) edges; and
   (d) a plurality of spaced apart, upwardly open channels disposed between said top surface ridges;
   said channels extending downwardly from said top surface, each said channel extending from one of said edges along a straight line across said top surface, said channels extending from said top surface downwardly a distance comprising at least 25% of the height of said thickness of said spacing sheet, said top surface ridges, in combination, being operatively continuous and effective to resist bonding of said spacing sheet.

5. A spacing sheet as in claim 4 wherein said channels extend from said top surface downwardly a distance comprising at least 40% of the height of said thickness of said spacing sheet.

6. A spacing sheet for supporting a layer of material thereon, said spacing sheet comprising:
   (a) a top sheet member, said top sheet member comprising a plurality of spaced apart top surface ridges adapted to support the layer of material, and a top surface comprising the totality of said top surface ridges;
   (b) a bottom sheet member secured to said top sheet member, said bottom sheet member comprising a bottom surface adapted to contact and interface with an underlying support;
   said top and bottom surfaces defining opposing extremities, and thereby a thickness, of said spacing sheet, said thickness being between 0.25 inch and 2 inches;
   (c) edges; and
   (d) a plurality of spaced apart, upwardly open channels in said top sheet member, said channels extending downwardly from said top surface, each said channel extending from one of said edges along a straight line across said top surface, said channels extending from said top surface downwardly a distance comprising at least 30% of said thickness of said spacing sheet.

7. A spacing sheet as in claim 6, said bottom surface corresponding in size generally to said top surface, said bottom sheet member being adapted, by said securement to said top sheet member, to resist bending of said spacing sheet.

8. A spacing sheet as in claim 6, said channels extending between said top surface ridges, said channels in said top sheet member comprising first channels, extending in a first direction, generally parallel to each other, said bottom sheet member corresponding in general shape and construction to said top sheet member, said bottom sheet member comprising spaced apart bottom surface ridges, and second channels extending upwardly from said bottom surface, between said bottom surface ridges, said second channels extending in a direction generally perpendicular to said first direction.

9. A spacing sheet for supporting a layer of material thereon, said spacing sheet comprising:
   (a) a top sheet member, said top sheet member comprising a plurality of spaced apart top surface ridges adapted to support the layer of material, and a top surface comprising the totality of said top surface ridges;
   (b) a bottom sheet member secured to said top sheet member, said bottom sheet member comprising a bottom surface adapted to contact and interface with a flat supporting surface underlying the spacing sheet,
   said top and bottom surfaces defining opposing extremities, and thereby a thickness, of said spacing sheet, said thickness being no greater than 2 inches;
   (c) edges; and
   (d) a plurality of spaced apart, upwardly open channels, extending downwardly from said top surface, each said channel extending from one of said edges along a straight line across said top surface.

10. A spacing sheet as in claim 9, said channels comprising first channels between said top surface ridges, said first channels extending in a first direction generally parallel to each other, said bottom sheet member having spaced apart bottom surface ridges, and second channels, extending upwardly from said bottom surface, between said bottom surface ridges, said second channels extending in a direction generally perpendicular to said first direction.

11. A spacing sheet as in claim 1, said top surface having a first coefficient of friction "coft" due to intrinsic properties of said top surface ridges, and said bottom surfaces having a second coefficient friction "cofb" greater than said coefficient of friction of said top surface.

12. A spacing sheet as in claim 6, said top surface having a first coefficient of friction "coft" due to intrinsic properties of said top surface ridges, and said bottom surface having a second coefficient of friction "cofb" greater than said coefficient of friction of said top surface.

13. A spacing sheet as in claim 7, said top surface having a first coefficient of friction "coft" due to intrinsic properties of said top surface ridges, and said bottom surface having a second coefficient of friction "cofb" greater than said coefficient of friction of said top surface.

14. A spacing sheet as in claim 8, said top surface having a first coefficient of friction "coft" due to intrinsic properties of said top surface ridges, and said bottom surface having a second coefficient of friction "cofb" greater than said coefficient of friction of said top surface.

15. A material load comprising (i) a layer of material, and (ii) a spacing sheet as in claim 1 under said layer of material.

16. A material load comprising (i) a layer of material, and (ii) a spacing sheet as in claim 2 under said layer of material.

17. A material load comprising (i) a layer of material, and (ii) a spacing sheet as in claim 3 under said layer of material.

18. A material load comprising (i) a layer of material, and (ii) a spacing sheet as in claim 4 under said layer of material.

19. A material load comprising (i) a layer of material, and (ii) a spacing sheet as in claim 5 under said layer of material.

20. A material load comprising (i) a layer of material, and (ii) a spacing sheet as in claim 6 under said layer of material.

21. A material load comprising (i) a layer of material, and (ii) a spacing sheet as in claim 8 under said layer of material.

22. A material load comprising (i) a layer of material, and (ii) a spacing sheet as in claim 9 under said layer of material.

23. A material load comprising (i) a layer of material, and (ii) a spacing sheet as in claim 11 under said layer of material.

24. A material load comprising (i) a layer of material, and (ii) a spacing sheet as in claim 12 under said layer of material.

25. A material load comprising (i) a layer of material, and (ii) a spacing sheet as in claim 13 under said layer of material.

26. A material load comprising (i) a layer of material, and (ii) a spacing sheet as in claim 14 under said layer of material.

27. A spacing sheet as in claim 7, said bottom sheet being substantially flat.

28. A material load comprising (i) a layer of material and (ii) a spacing sheet as in claim 27 under said layer of material.

29. A spacing sheet as in claim 4, said spacing sheet being adapted to facilitate sliding removal of the layer of material therefrom.

30. A spacing sheet as in claim 9, said spacing sheet being adapted to facilitate sliding removal of the layer of material therefrom.

* * * * *